(12) United States Patent
Raiz et al.

(10) Patent No.: US 8,458,608 B2
(45) Date of Patent: Jun. 4, 2013

(54) FOCUS STATE THEMEING

(75) Inventors: Gregory L Raiz, Bellevue, WA (US);
Christopher A. Evans, Sammamish, WA (US); Louis Amadio, Issaquah, WA (US); Aaron B. Tinling, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1226 days.

(21) Appl. No.: 11/408,651

(22) Filed: Apr. 21, 2006

(65) Prior Publication Data

US 2006/0271874 A1 Nov. 30, 2006

Related U.S. Application Data

(63) Continuation of application No. 09/827,957, filed on Apr. 5, 2001, now abandoned, which is a continuation-in-part of application No. 09/670,791, filed on Sep. 27, 2000, now Pat. No. 6,873,337.

(60) Provisional application No. 60/195,593, filed on Apr. 6, 2000, provisional application No. 60/196,004, filed on Apr. 7, 2000.

(51) Int. Cl.
*G06F 3/048* (2006.01)

(52) U.S. Cl.
USPC .............. 715/765; 715/866; 715/744

(58) Field of Classification Search
USPC .............. 715/765, 866, 744, 730, 854
See application file for complete search history.

(56) References Cited

U.S. PATENT DOCUMENTS

| 5,301,301 A | 4/1994 | Kodosky et al. |
| 5,301,336 A | 4/1994 | Kodosky et al. |

(Continued)

FOREIGN PATENT DOCUMENTS

| EP | 0371941 | 6/1990 |
| EP | 0442676 | 8/1991 |

(Continued)

OTHER PUBLICATIONS

Stardock WindowBlinds, "What is WindowBlinds?" downloaded Oct. 9, 2010 from URL: http://www.stardock.com/products/windowblinds/main.html; 4 pages.

(Continued)

*Primary Examiner* — Namitha Pillai
(74) *Attorney, Agent, or Firm* — Merchant & Gould P.C.

(57) ABSTRACT

Focus state themeing is accomplished by separating the processing of the focus state from the processing of an operative state of a control element. The operative states of the control element are entered or exited based upon the detection of input from a user or the detection of control availability by the operating system or by an application running on the operating system. Once an operative state is determined for a control element, the focus state of the control element is detected and merged with the operative state to generate a theme state for the control element. The theme state is a combination of the operative state and the focus state. There is one combined theme state for each operative-focus combination. Various display configurations may be used to represent a control element with a combined operative-focus state. The control element is then rendered on a display based on the operative state theme and the focus state theme.

12 Claims, 9 Drawing Sheets

U.S. PATENT DOCUMENTS

| | | | |
|---|---|---|---|
| 5,327,529 A | 7/1994 | Fults et al. | |
| 5,596,702 A | 1/1997 | Stucka et al. | |
| 5,603,034 A | 2/1997 | Swanson | |
| 5,655,093 A | 8/1997 | Frid-Nielsen | |
| 5,838,317 A | 11/1998 | Bolnick et al. | |
| 5,862,379 A | 1/1999 | Rubin et al. | |
| 5,872,973 A | 2/1999 | Mitchell et al. | |
| 5,880,729 A | 3/1999 | Johnston et al. | |
| 5,893,107 A | 4/1999 | Chan et al. | |
| 5,905,492 A | 5/1999 | Straub et al. | |
| 5,917,487 A | 6/1999 | Ulrich | |
| 5,956,506 A | 9/1999 | Cobb et al. | |
| 5,959,624 A | 9/1999 | Johnston, Jr. et al. | |
| 5,963,206 A | 10/1999 | Ulrich et al. | |
| 5,974,470 A | 10/1999 | Hammond | |
| 6,014,138 A | 1/2000 | Cain et al. | |
| 6,039,047 A * | 3/2000 | Rock et al. | 128/897 |
| 6,072,501 A | 6/2000 | Bier | |
| 6,091,411 A | 7/2000 | Straub et al. | |
| 6,104,391 A | 8/2000 | Johnston, Jr. et al. | |
| 6,128,007 A | 10/2000 | Seybold | |
| 6,137,492 A | 10/2000 | Hoppe | |
| 6,188,399 B1 | 2/2001 | Voas et al. | |
| 6,215,495 B1 | 4/2001 | Grantham et al. | |
| 6,219,056 B1 | 4/2001 | Felser et al. | |
| 6,239,795 B1 | 5/2001 | Ulrich et al. | |
| 6,243,102 B1 | 6/2001 | Ruff et al. | |
| 6,243,106 B1 | 6/2001 | Rehg et al. | |
| 6,307,574 B1 | 10/2001 | Ashe et al. | |
| 6,349,645 B1 | 2/2002 | Roskosch | |
| 6,353,451 B1 | 3/2002 | Teibel et al. | |
| 6,392,671 B1 | 5/2002 | Glaser | |
| 6,426,761 B1 | 7/2002 | Kanevsky et al. | |
| 6,466,228 B1 | 10/2002 | Ulrich et al. | |
| 6,538,651 B1 | 3/2003 | Hayman et al. | |
| 6,580,438 B1 | 6/2003 | Ichimura et al. | |
| 6,598,219 B1 | 7/2003 | Lau | |
| 6,613,099 B2 | 9/2003 | Crim | |
| 6,664,981 B2 | 12/2003 | Ashe et al. | |
| 6,668,354 B1 | 12/2003 | Chen et al. | |
| 6,710,782 B2 | 3/2004 | Ruff et al. | |
| 6,753,885 B2 | 6/2004 | Stoakley et al. | |
| 6,779,027 B1 | 8/2004 | Schunicht et al. | |
| 6,853,868 B1 | 2/2005 | Albers et al. | |
| 6,873,337 B1 | 3/2005 | Fernandez et al. | |
| 6,909,437 B2 | 6/2005 | Ruff et al. | |
| 6,918,091 B2 * | 7/2005 | Leavitt et al. | 715/765 |
| 6,992,681 B2 | 1/2006 | Evans et al. | |
| 7,017,162 B2 | 3/2006 | Smith et al. | |
| 7,137,066 B2 | 11/2006 | Fernandez et al. | |
| 7,181,686 B1 | 2/2007 | Bahrs | |
| 7,190,369 B2 | 3/2007 | Fernandez et al. | |
| 7,376,906 B2 | 5/2008 | Fernandez et al. | |
| 7,565,611 B2 | 7/2009 | Fernandez et al. | |
| 7,694,229 B2 | 4/2010 | Stoakley et al. | |
| 2001/0045961 A1 | 11/2001 | Stoakley et al. | |
| 2001/0048448 A1 | 12/2001 | Raiz et al. | |
| 2002/0054046 A1 | 5/2002 | Evans et al. | |
| 2002/0099713 A1 | 7/2002 | Fernandez et al. | |
| 2003/0028685 A1 | 2/2003 | Smith et al. | |
| 2003/0052921 A1 | 3/2003 | Ulrich et al. | |
| 2003/0093419 A1 | 5/2003 | Bangalore et al. | |
| 2003/0101439 A1 | 5/2003 | Desoli et al. | |
| 2003/0167277 A1 | 9/2003 | Hejlsberg et al. | |
| 2003/0167355 A1 | 9/2003 | Smith et al. | |
| 2003/0167356 A1 | 9/2003 | Smith et al. | |
| 2003/0172196 A1 | 9/2003 | Hejlsberg et al. | |
| 2003/0177282 A1 | 9/2003 | Hejlsberg et al. | |
| 2003/0184590 A1 | 10/2003 | Will | |
| 2003/0200254 A1 | 10/2003 | Wei | |
| 2004/0196293 A1 | 10/2004 | Fernandez et al. | |
| 2005/0015729 A1 | 1/2005 | Fernandez et al. | |
| 2005/0091576 A1 | 4/2005 | Relyea et al. | |
| 2009/0119578 A1 | 5/2009 | Relyea et al. | |

FOREIGN PATENT DOCUMENTS

| | | |
|---|---|---|
| EP | 0860773 | 8/1998 |
| EP | 1077404 | 2/2001 |
| EP | 1143334 | 10/2001 |
| EP | 1283465 | 2/2003 |
| EP | 1536327 | 6/2005 |
| EP | 1536451 | 6/2005 |
| JP | 5508726 | 12/1993 |
| JP | Hei-10-500512 | 1/1998 |
| JP | 2000163490 | 6/2000 |
| KR | 20010076789 | 8/2001 |
| KR | 20020040588 | 5/2002 |
| KR | 20030036736 | 12/2004 |
| RU | 2157000 | 9/2000 |
| RU | 2212118 C2 | 9/2003 |
| WO | WO 95/31773 | 11/1995 |
| WO | WO 03065173 | 8/2003 |

OTHER PUBLICATIONS

"OMG! It's SKINtacular!" downloaded Oct. 9, 2000 from URL: http://www.skinz.org; 4 pages.

"OMG! It's SKINtacular!", retrieved from <<http://replay.waybackmachine.org/20001109O436/http://www.skinz.org/>>, available as early as Nov. 9, 2000; 4 pages.

Stardock WindowBlinds, "What is WindowBlinds?", retrieved from <http://www.stardock.com/products/windowblinds/main.html> on Mar. 17, 2011 but available as early as Oct. 9, 2010; 1 page.

U.S. P.T.O Non-Final Office Action cited in U.S. Appl. No. 12/207,398, mailed Mar. 16, 2012; 28 pages.

U.S.P.T.O Non-Final Office Action cited in U.S. Appl. No. 11/083,177, mailed Jul. 10, 2001; 9 pages.

Amendment and Response to Non-Final Office Action cited in U.S. Appl. No. 11/083,177, Filed Oct. 10, 2001; 11 pages.

Notice of Allowance cited in U.S. Appl. No. 11/083,177, mailed Nov. 14, 2006; 7 pages.

Notice of Allowance cited in U.S. Appl. No. 09/827,993 mailed Jul. 11, 2006 ,7 pgs.

U.S. Appl. No. 09/827,993, Amendment Under 37 Cfr § 1.116 filed Jun. 21, 2006, 12 pgs.

US Final Office Action U.S. Appl. No. 09/827,993, mailed Apr. 21, 2006, 14 pgs.

U.S. Appl. No. 09/827,993, Amendment, 11 pgs.

US Office Action U.S. Appl. No. 09/827,993, mailed Oct. 31, 2005, 13 pgs.

U.S. Appl. No. 09/827,993, Amendment Under 37 CFR § 1.116 filed Jun. 2, 2005, 15 pgs.

US Final Office Action U.S. Appl. No. 09/827,993, mailed Apr. 4, 2005, 11 pgs.

U.S. Appl. No. 09/827,993, Amendment filed Nov. 23, 2004, 11 pgs.

US Office Action U.S. Appl. No. 09/827,993, mailed Aug. 25, 2004, 10 pgs.

U.S. Appl. No. 10/918,153, Notice of Allowance mailed Dec. 29, 2008, 9 pgs.

U.S. Appl. No. 10/918,153, Notice of Allowance mailed Jun. 24, 2008, 8 pgs.

U.S. Appl. No. 10/918,153, Amendment and Response filed Mar. 3, 2008, 12 pgs.

U.S. Appl. No. 10/918,153, Amendment and Response filed Oct. 29, 2007, 11 pgs.

U.S. Appl. No. 10/918,153, Non-Final Office Action mailed Jul. 27, 2007, 7 pgs.

U.S. Appl. No. 10/918,032, Notice of Allowance mailed Feb. 7, 2008, 3 pgs.

U.S. Appl. No. 10/918,032, Amendment and Response filed Nov. 2, 2007, 11 pgs.

U.S. Appl. No. 10/918,032, Non-Final Office Action mailed Jul. 2, 2007, 9 pgs.

U.S. Appl. No. 10/830,290, Amendment and Response filed Nov. 25, 2009, 12 pgs.

U.S. Appl. No. 10/830,290, Final Office Action mailed Aug. 4, 2009, 16 pgs.

U.S. Appl. No. 10/830,290, Amendment and Response filed May 4, 2009, 13 pgs.

U.S. Appl. No. 10/830,290, Non-Final Office Action mailed Feb. 3, 2009, 15 pgs.
U.S. Appl. No. 10/830,290, Amendment and Response filed Nov. 6, 2008, 12 pgs.
U.S. Appl. No. 10/830,290, Final Office Action mailed Aug. 6, 2008, 15 pgs.
U.S. Appl. No. 10/830,290, Amendment and Response filed Nov. 20, 2007, 10 pgs.
U.S. Appl. No. 10/830,290, Non-Final Office Action mailed Aug. 20, 2007, 13 pgs.
U.S. Appl. No. 10/830,290, Amendment and Response filed Jun. 7, 2007, 11 pgs.
U.S. Appl. No. 10/830,290, Non-Final Office Action mailed Mar. 7, 2007, 13 pgs.
U.S. Appl. No. 10/868,086, Notice of Allowance mailed Oct. 4, 2005, 7 pgs.
U.S. Appl. No. 10/868,086, Amendment and Response filed Jul. 12, 2005, 5 pgs.
U.S. Appl. No. 10/868,086, Non-Final Office Action mailed May 3, 2005, 9 pgs.
Non-Final Office Action mailed Oct. 27, 2003, cited in U.S. Appl. No. 09/827,957, 10 pages.
Amendment and Response dated Jan. 27, 2004, cited in U.S. Appl. No. 09/827,957, 11 pages.
Final Office Action mailed Apr. 1, 2004, cited in U.S. Appl. No. 09/827,957, 12 pages.
Amendment and Response dated May 27, 2004, cited in U.S. Appl. No. 09/827,957, 10 pages.
Advisory Action mailed Dec. 22, 2004, cited in U.S. Appl. No. 09/827,957, 3 pages.
Appeal Brief dated Jan. 3, 2005, cited in U.S. Appl. No. 09/827,957, 22 pages.
Examiner's Answer mailed Apr. 8, 2005, cited in U.S. Appl. No. 09/827,957, 11 pages.
Board of Patent Appeals and Interferences Decision on Appeal mailed Feb. 23, 2006, cited in U.S. Appl. No. 09/827,957, 6 pages.
Chan, "The Java Class Libraries, Second Edition, vol. 2," java.awt, Oct. 1997, Addison Wesley, pp. 303-395.
Norwegian Office Action mailed Oct. 31, 2011 far Norwegian Patent Application No. 20043781; 5 pages.
Norwegian Office Action and Search Report mailed Jun. 23, 2011 for Norwegian Patent Application No. 20043782; 6 pages.
Japanese Final Rejection and Decision to Decline the Amendment mailed Aug. 2, 2011 for Japanese Patent Application No. 2004-264629 (in Japanese with English translation); 7 pages.
Japanese Notice of Rejection mailed Apr. 8, 2011 for Japanese Patent Application No. 2004-264626 (in Japanese with English translation); 11 pages.
Canadian Office Action mailed Jul. 11, 2011 for Canadian Patent Application No. 2481590, a counterpart foreign application of U.S. Appl. No. 10/694,080; 4 pages.
Republic of Korea Notice of Allowance mailed Jan. 20, 2001 for Korean Application No. 10-2004-0072676 (in Korean—no English translation available); 2 pages.
Lakshminarayanan, "The .Net Schema Object Model", retrieved at <<http://www.xml.com/1pt/a/1074>> on Oct. 21, 2007, O'Reilly Media, Inc. Dec. 4, 2002; 17 pages.
Okuda, "Flash MX Design Factory", Japan, Aug. 1, 2003 (in Japanese—no English translation available); 4 pages.
Powers, et al., Visual Basic Programmer's Guide to the .NET Framework Class Library, Jan. 2, 2002, Sam s, 7 pages.
Tanaka, "Synthetic Media Architecture", Report of Study of Information Processing Society of Japan, vol. 91, No. 57 (91-IM-2) (English Abstract); pp. 1-8, Information Processing Society of Japan; Jul. 12, 1991.
Cutting Edge—SqlDataNavigator—Part III; (in Japanese—no English translation available); 10 pages.
U.S. Appl. No. 09/827,842, Office Action mailed Feb. 3, 2004, 12 pgs.
U.S. Appl. No. 09/827,842, Office Action mailed May 29, 2003, 12 pgs.
U.S. Appl. No. 09/827,842, Notice of Allowance mailed Apr. 29, 2004, 9 pgs.

U.S. Appl. No. 09/825,488, Notice of Allowance mailed Apr. 5, 2004, 6 pgs.
U.S. Appl. No. 09/825,488, Amendment and Response filed Feb. 5, 2004, 11 pgs.
U.S. Appl. No. 09/825,488, Office Action mailed Nov. 5, 2003, 10 pgs.
"API Documentation", web page: http://web.archives.orglweb/20030207054709/java.sun.comlapis.html, Dec. 11, 2002, printed Sep. 16, 2004, 2 pgs.
Akamai Design, "ALOHA! Welcome to Akamai Design", accessed online on Oct. 9, 2000 at: http://akamaidesign.com, 2 pgs.
Australian $2^{nd}$ Office Action in Application 2004205327, mailed Dec. 1, 2009, 1 pg.
Australian Notice of Allowance in Application 2004205327, mailed Mar. 19, 2010, 3 pgs.
Australian Office Action in Application 2004205327, mailed Sep. 30, 2009, 2 pgs.
Chinese $1^{st}$ Office Action in Application 200410078504.1, mailed Jul. 27, 2007, 3 pgs.
Chinese $1^{st}$ Office Action in Application 200610100604.9, mailed Feb. 1, 2008, 14 pgs.
Chinese 2nd Office Action in Application 200410078504.1, mailed Jun. 6, 2008, 3 pgs.
Chinese Notice of Allowance in Application 200410078504.1, mailed Apr. 17, 2009, 4 pgs.
Chinese Notice of Allowance in Application 200610100604.9, mailed Nov. 28, 2008, 4 pgs.
Cox, Philip T., "Picture The Future," *Object Magazine*, pp. 46-49, Jul.-Aug. 1993.
Depalo William, "Re: Extra buttons on the title bar of a form", Message-ID: <OPJ9sjxp9GA.2448Uppssnewspub05.moswest.ms 23-25 n. net>USENET NEWSGROUP MESSAGE, 'Online! 4 Jul. 1998, retrieved from the Internet on Jan. 20, 2005: http://groupsbeta.google.com/group/microsoft.public.win32.programmeruilmsg/3c53c83cd9f9d67a?dm ode=source>.
European Exam Report in Application 04020899.3, mailed Nov. 22, 2007, 8 pgs.
European Office Action in Application 01460022,5, mailed Aug. 2, 2007, 3 pgs.
European Office Action in Application 04020899.3, mailed Feb. 16, 2009, 4 pgs.
European Official Communication in Application 04020899.3, mailed Jul. 11, 2008, 1 page.
European Oral Summons in Application 04020899.3, mailed Mar. 21, 2012, 6 pgs.
European Search Report in Application 01460022, mailed Jan. 21, 2005, 5 pgs.
European Search Report in Application 04020899.3, mailed Aug. 7, 2007, 5 pgs.
Israel Office Action in Application 164072, mailed Mar. 3, 2009, 2 pgs.
Israel Office Action in Application 164072, mailed Jul. 12, 2011, 2 pgs.
Japanese Notice of Rejection in Application 2004-264628, mailed Dec. 10, 2010, 5 pgs.
Java 2 Platform, Standard Edition (J2SE):, web page: http://webarchives.org/web/20030207125037/java.sun.coml/docs, Sep. 16, 2004, 3 pgs.
"Java 2 Platform, Standard Edition, v 104.1 API Specification", web page: http://web.archives.org/web/2004021 0 134055/http://java.sun.comlj2se/lAlldocs/api/overview-summary.html, 2002, printed Sep. 16, 2004, 8 pgs.
"Java 2SDK, Standard Edition Documentation", Version 104.1, web page: http://web.archives.org/web/20030206231542/java.sun.com1j2se/1.4.11docslindex.html, 2002, printed Sep. 16, 2004, 5 pgs.
Lord, Hambleton D., "Visual Programming for Visual Applications: A New Look for Computing," *Object Magazine*, pp. 37-40, Jul.-Aug. 1994.
Malaysian Office Action in Application PI20042929, mailed Nov. 21, 2008, 3 pgs.
Marsan, Anne L. et al., "Computational Techniques for Automatically Tiling and Skinning Branched Objects," *Computers & Graphics*, 23 (1999), pp. 111-126.

Philippines Office Action in Application 12004000387, mailed Mar. 10, 2005, 1 pg.
Philippines Office Action in Application 12004000387, mailed Aug. 10, 2007, 1 pg.
Philippines Office Action in Application 12004000387, mailed Sep. 1, 2009, 2 pgs.
"Programmer's Guide to the Java 2D API", Java 2 SDK, Standard Edition, 104 version, Apr. 24, 2001, web site: http://web.archives.org/web/20030405075635/http://java.sun.comlj2sel104.2/docs/guide/2d/specli2d-bo. . . , printed Sep. 16, 2004, 5 pgs.
Roe David: "Re: WM_NCPAINT: anyone ever respond to this?"—Message-ID: (30abfj$mfi@1mp.demon.co.uk), Usenet Newsgroup Message, Online! May 4, 1995, retrieved Jan. 20, 2005 online: http://groups-beta.google.com/group/com.os.mswindows.programmertools/msg/7e80304d255cf274?dmode=source.
Russian Notice of Allowance in Application 2004127210, mailed Apr. 21, 2009, 14 pgs.
Russian Office Action in Application 2004127210, mailed Sep. 8, 2008, 4 pgs.
Shelest, Art, "Re: Hacking winNT GDI32.DLL,—Message-ID: <4oahrr$3a4094_008®news.hooked.net)" 23-25 USCNET NEWSGROUP, 'Online! May 26, 1996, Retrieved from the Internet on Jan. 20, 2005: http://groups-beta.Qoogle.com/group/comp.o$.mGwindow—programmer.win32/msg/4915c06636696f86?dmode=source>.
Taiwan Office Action in Application 93121807, mailed Feb. 10, 2011, 3 pgs.
Taiwanese Notice of Allowance in Application 093121805, mailed Feb. 21, 2012, 4 pgs.
Taiwanese Search Report in Application 093121805, mailed Aug. 31, 2010, 1 pg.
U.S. Appl. No. 09/670,791, Advisory Action mailed Jun. 10, 2004, 4 pgs.
U.S. Appl. No. 09/670,791, Amendment and Response filed Jan. 9, 2004, 17 pgs.
U.S. Appl. No. 09/670,791, Amendment and Response filed Oct. 8, 2004, 11 pgs.
U.S. Appl. No. 09/670,791, Amendment and Response filed May 18, 2004, 8 pgs.
U.S. Appl. No. 09/670,791, Notice of Allowance mailed Dec. 28, 2004, 7 pgs.
U.S. Appl. No. 09/670,791, Office Action mailed Jan. 29, 2003, 14 pgs.
U.S. Appl. No. 09/670,791, Office Action mailed Mar. 18, 2004, 13 pgs.
U.S. Appl. No. 09/670,791, Office Action mailed Aug. 11, 2004, 13 pgs.
U.S. Appl. No. 10/830,290, Amendment and Response filed Nov. 26, 2008, 9 pgs.
U.S. Appl. No. 10/839,908, Amendment and Response filed Mar. 23, 2009, 16 pgs.
U.S. Appl. No. 10/839,908, Amendment and Response filed Sep. 11, 2008, 17 pgs.
U.S. Appl. No. 10/839,908, Amendment and Response filed Sep. 15, 2009, 12 pgs.
U.S. Appl. No. 10/839,908, Notice of Allowance mailed Jan. 12, 2010, 4 pgs.
U.S. Appl. No. 10/839,908, Notice of Allowance mailed Nov. 17, 2009, 4 pgs.
U.S. Appl. No. 10/839,908, Office Action mailed Dec. 23, 2008, 11 pgs.
U.S. Appl. No. 10/839,908, Office Action mailed Jun. 11, 2008, 9 pgs.
U.S. Appl. No. 10/839,908, Office Action mailed Jun. 8, 2009, 9 pgs.
U.S. Appl. No. 10/918,153, Amendment and Response filed Nov. 13, 2007, 12 pgs.
U.S. Appl. No. 11/083,177, Amendment and Response filed Oct. 10, 2006, 11 pgs.
U.S. Appl. No. 11/083,177, Office Action mailed Jul. 10, 2006, 10 pgs.
White et al, "JDBC API Tutorial and Reference, Second Edition" 1999, Addison Wesley, XP002443140, ISBN: 0-201-43328-1, p. 18 and p. 99-p. 103.
Wood J. et al., "Subclass Your Way Around VB's Limitations", Visual Basic Programmer's Journal Fawcetter, Technical Publications USA, 'Online! vol. 5, No. 9, Sep. 1, 1995, pp. 34-47, retrieved Jan. 20, 2005 online at: http://www.ftponline.com/archives/premier/mgznarch/vbpj/1995/09sep95/subclass.pdf.
U.S. Appl. No. 10/694,080, Office Action mailed Apr. 10, 2007, 22 pgs.
U.S. Appl. No. 10/694,080, Amendment and Response filed Oct. 9, 2007, 20 pgs.
U.S. Appl. No. 10/694,080, Office Action mailed Dec. 27, 2007, 20 pgs.
U.S. Appl. No. 10/694,080, Office Action mailed Apr. 9, 2008, 21 pgs.
U.S. Appl. No. 12/207,398, Amendment and Response filed Aug. 16, 2012, 19 pgs.
U.S. Appl. No. 09/827,993, Advisory Action mailed Jun. 20, 2005, 3 pgs.
U.S. Appl. No. 09/827,993, Amendment filed Jan. 31, 2006, 12 pgs.
European Office Action mailed Mar. 21, 2012 for European patent application No. 04020899.3, 6 pages.
Norwegian Office Action mailed Feb. 29, 2012 for Norwegian patent application No. 20043782, 1 page.
U.S. Appl. No. 12/208398, Amendment and Response filed Feb. 7, 2013, 32 pgs.
U.S. Appl. No. 12/207,398, Office Action mailed Nov. 7, 2012, 43 pgs.
U.S. Appl. No. 10/830,290, Non-Final Office Action mailed Dec. 19, 2012, 28 pgs.

* cited by examiner

FOCUS STATE THEMEING

CROSS-REFERENCE TO RELATED APPLICATION

This application is a continuation of U.S. patent application Ser. No. 09/827,957 (abandoned), filed Apr. 5, 2001, and entitled "Focus State Themeing,", which is a continuation-in-part application of U.S. patent application Ser. No. 09/670,791 (now U.S. Pat. No. 6,873,337), filed Sep. 27, 2000, issued as U.S. Pat. No. 6,873,337, and entitled "Application Programming Interface For Changing The Visual Style," which claims the benefit of U.S. Provisional Application No. 60/195,593, filed Apr. 6, 2000. This application further claims the benefit of U.S. Provisional Application No. 60/196,004 filed Apr. 7, 2000 and entitled "Focus State Themeing."

TECHNICAL FIELD

The present invention relates to a computer system and, more particularly, to changing the theme of a focus state indicator for control elements in a graphical user interface.

BACKGROUND OF THE INVENTION

Computer users in both the business and home environment have become accustomed to using a computer with a graphical operating system. For example, many users operate computers having a Microsoft Corporation "WINDOWS" operating system thereon. Certain components of these graphical operating systems are known as "controls." For example, a control may be an "OK" button, which is generally a rectangular button with "OK" written in it. By moving the cursor over the button and clicking on the mouse, a known operation will begin that is associated with the control. Many other controls exist, with examples including scroll bars, dialog boxes and sliders. Beyond controls, the graphical operating systems also draw, or render, other graphical components as needed on the display of the computer, such as the frame, the minimize box and the close box.

There are two general kinds of controls in WINDOWS: standard and custom. Standard controls are provided by the operating system. The code to create, draw and operate standard controls is contained in the common control library (DLL), a part of WINDOWS. Custom controls are all other controls. Custom controls may be created by the manufacturer of the operating system or by third parties. The code for custom controls is contained in a corresponding separate library (DLL) or within an application.

Currently, when a graphical user interface component, such as a control, is used by an application, the application requests that an instance of the component be created. Following this, the operating system transmits a generic message to the component, instructing the component to render itself. The application plays a role in routing the message from the main window to the targeted control, but the control code performs the drawing. The application uses application programming interfaces (API's) to create and interact with the control. An API serves as a software interface to be used by other programs, much as the keypad serves as an interface to a calculator. An API is a fundamental concept of high-level programming. In high-level programming, a program often does not execute tasks by itself. Instead, the program asks some other program to execute these tasks. For example, programs frequently delegate various tasks to the underlying operating system. Continuing with the above example, an application delegates the rendering of a control to the control's code.

In the prior art environment, when a generic rendering message is received by a control to draw itself, the control will draw itself using its own drawing software code. In this prior art environment, the control knows what it is supposed to look like, how it is supposed to behave, and can effectuate such a display on the user interface of the computer. Thus, the application may delegate all aspects of visual rendering to the controls, avoiding the need to contain software code to support the visual rendering of the control within the host application itself.

By utilizing the standard controls defined and rendered by the operating system, all controls will have the same appearance, regardless of the application. Users of graphical operating systems can change only a limited number of characteristics of the controls. In the "WINDOWS" operating system, a user can change the color scheme used to display the various controls and components on the monitor. The user can also select a small set of fonts to be used by the controls and components. The user can also specify a limited number of nonclient sizes that will control the sizing of the nonclient areas. Thus, the colors, fonts and a limited set of sizes of the controls and components may be changed. However, the basic appearance of the controls and components is dictated by the rendering software code within the control library containing the particular graphical component or control. In the prior art environment, to change the appearance of the controls or graphical components, the rendering software code must be altered. For example, if it is desired to change the appearance of the "OK" button, the rendering software code within the operating system DLL file containing the button control must be altered and the DLL file reconstructed at the binary level. If it was desired to render the button as an oval with "okay" written inside, the software code would have to be changed accordingly. Such an approach makes it difficult, if not impossible, for a computer user and for software manufacturers, to easily alter the appearance of the controls and graphical components.

In order to enhance the user experience of the computer, it would be desirable for the user to have the ability to change the overall "look and feel" of the graphical display by changing the overall visual appearance or "theme" of the various graphical components. In other words, it would be desirable if the user could change not only the color and font of the graphical components appearing on the monitor, but to change the appearance of those graphical components as well. For example, it would be desirable to be able to alter and direct the layout of the parts of a control, and to define the shape of a control or its parts. It would also be desirable to control all aspects of how a control or its parts are drawn. Because the controls and graphical components existing within the DLL file in the prior art environment are "hard coded" with their own rendering software code, it is difficult and cumbersome to change the appearance of all of the controls and components. To do so would require recoding each of the controls to achieve the desired appearance. If multiple visual styles were required, they would each have to be pre-defined and each "hard coded" into every control. Moreover, the controls must also be recoded if a different rendering technology is to be used. For example, if the controls are rendered using a bitmap and it is desired to utilize a vector-based renderer, each control must be altered.

Moreover, existing techniques do not provide an interface through which software developers can design controls to accommodate versatility in visual appearance. The prior art approaches do not involve an architecture that allows a control author the flexibility to design a control that is "theme aware." Control authors are therefore not allowed the freedom needed in authoring controls to create controls which can easily be visually altered.

As a part of changing the theme for controls it is desirable to also change the theme of focus state indicators associated with controls. Focus state indicators are used in keyboard access graphical user interfaces such as the user interface provided by the Microsoft Windows operating system. However, these focus state indicators are currently apart of the image rendered for a given control. Therefore, to change the theme of a focus state indicator for each control would require changing the rendering code for drawing each control.

SUMMARY OF THE INVENTION

In accordance with this invention, the above and other problems are solved by separating the processing of the focus state from the processing of an operative state of a control element. The operative states may be disabled, normal, hot and active. These states are entered or exited based upon the detection of input from a user or the detection of control availability by the operating system or by an application running on the operating system. Once an operative state is determined for a control element, the focus state of the control element is detected and merged with the operative state to generate a theme state for the control element. The theme state is a combination of the operative state and the focus state. There is one combined theme state for each operative-focus combination. Various display configurations may be used to represent a control element with a combined operative-focus state. The control element is then rendered on a display based on the theme state.

In accordance with other aspects, the present invention relates to a system for themeing a-focus state indicator separate from an operative theme for a control component in a graphical operating system. In the system an operative state module determines the operative state of the control component. A focus state detector tests whether or not the control component is in a focus state and indicates either focus condition or a non-focus condition. A build combined state module in response to the focus condition merges the operative state and the focus state into a combined state indicating the control component may be rendered based on both a operative state theme and a focus state theme.

In accordance with another aspect of the invention, a user interface with selectable focus indicators for control elements in a graphical user interface for a computing system is provided. The computing system has a display and a keyboard, and a control element in a focus state is selectable with a keystroke on the keyboard. The user interface comprises the following operations. An operative state theme for rendering the display of an operative state for a control element is received. A focus state theme for rendering the focus state of the control element is also received. The control element is displayed in a combined operative-focus state. The rendering of the control element in the combined state is based on the operative state theme and the focus state theme. In this way control elements in the user interface have selectable focus indicators.

In accordance with still other aspects, the present invention relates to a method of changing visual styles of a focus state indicator in a control component in a graphical operating system running on a computing system. The method begins by receiving the operative state of the control component, and detecting whether or not the control component is in a focus state. When the control component is not in a focus state, the method draws the control component using an operative state theme. A combined state is created for the control component, when the control component is in a focus state. The combined state is a single merged state representing the operative state and the focus state. The method draws the control component in the combined state using the operative state theme and a focus state theme whereby the visual style of a focus state indicator in the control component is changed by the focus state theme.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Additional advantages and novel features of the invention will be set forth in part in a description which follows, and in part will become apparent to those skilled in the art upon examination of the following, or may be learned by practice of the invention.

DETAILED DESCRIPTION OF THE INVENTION

Figure 1:
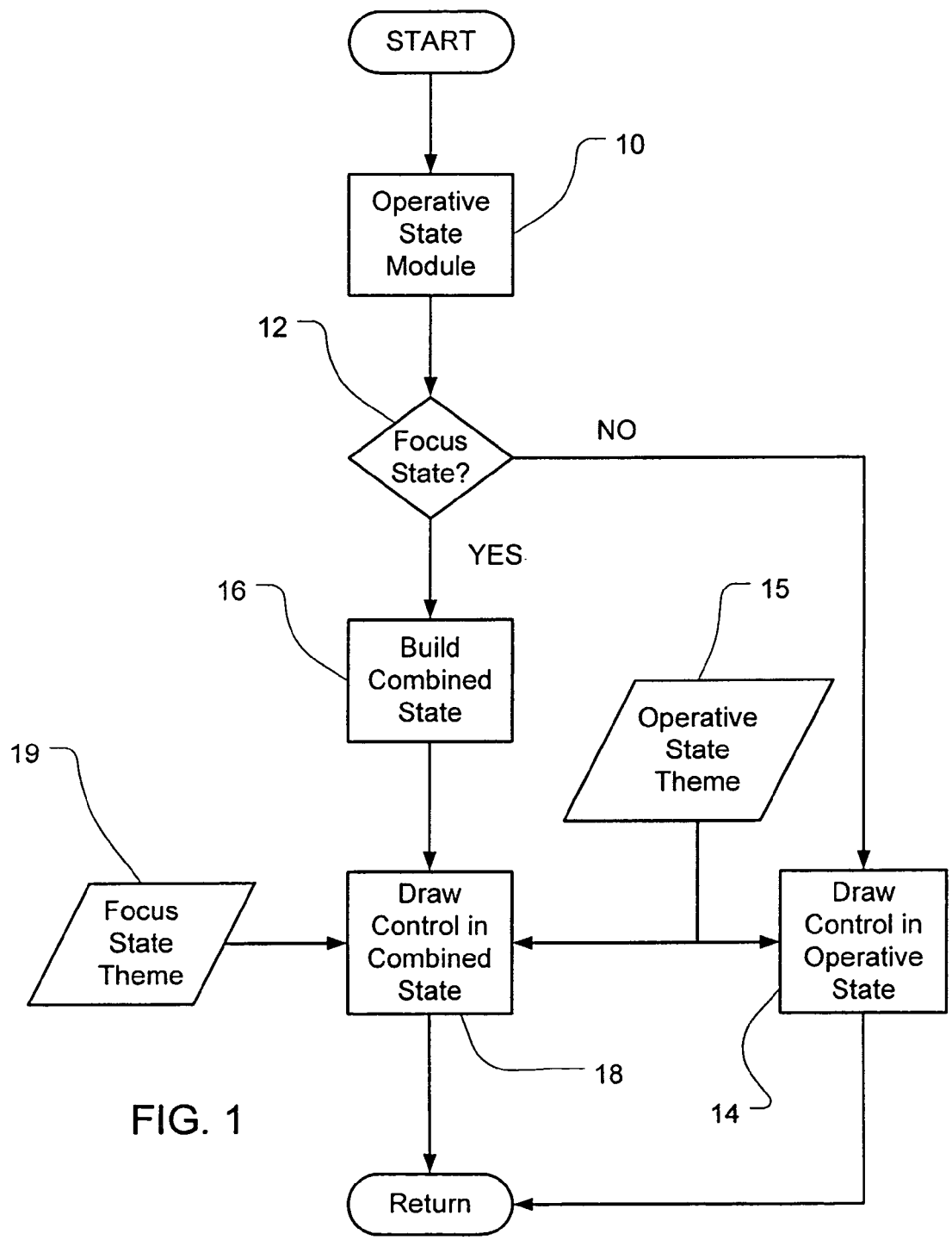
FIG. 1 shows the operational flow for one embodiment of the present invention for focus state themeing where there are selectable themes for the focus state of the control.

FIG. 1 illustrates the logical operations flow of one embodiment of the invention for rendering a control where there are selectable themes for the focus state of the control. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

At the beginning of the operational flow in FIG. 1, operative state module 10 as a part of the operating system generates an operative state or control state for a user interface element that is to be rendered or drawn on the display. The user interface elements having control states are typically control buttons, menu selections, icons, tabs or any control element that may be user selected by mouse or key stroke. In this description the user interface elements having control states are variously referred to as controls, control elements or control buttons. The operative state module is receiving input indicating availability or no availability for the control element and indicating user input relative to the control. The various operative states for the control are disabled, normal, hot, and selected. The operation of module 10 will be described in more detail hereinafter with reference to the state diagram shown in FIG. 7.

Focus state detect operation 12 tests whether the control, for which the operative state has been determined by module 10, is also in a focus state. If the control is not in a focus state, then operation flow branches from the focus state detection operation 12 to the draw operative state operation 14 for the control. Draw operative state operation 14 receives the operative state theme data 15 and draws the control in its operative state, i.e., disabled, normal, hot, or selected, in accordance with a selected theme for the operative state.

If the focus state detection operation 12 detects that the control is also in focus state as well as the operative state, then the operation flow branches YES to the build combined state module 16. The build combined state module makes use of the operative state information and the focus state information to build a combined or merged theme state that represents in effect a combination of operative and focus. For example, if the control operative state is normal, and the control is also in a focus state, then module 16 will create a normal-focus merged theme state. Draw combined state operation 18 receives the operative state theme properties from operative state theme data 15 and also receives the focus state theme properties from focus state theme data 19. These properties are used by the draw combined state operation 18 to draw the control in the normal-focus state and render the normal control in a focused state representation on the display. By separating the focus state out of the operative state for the control, it is possible to apply different focus state themes to the control. Thus, the focus state indicators for a control may be adjusted to various visual styles. The draw operations 14 and 18 will be described in more detail hereinafter with reference to FIGS. 2 and 6.

Figure 9:
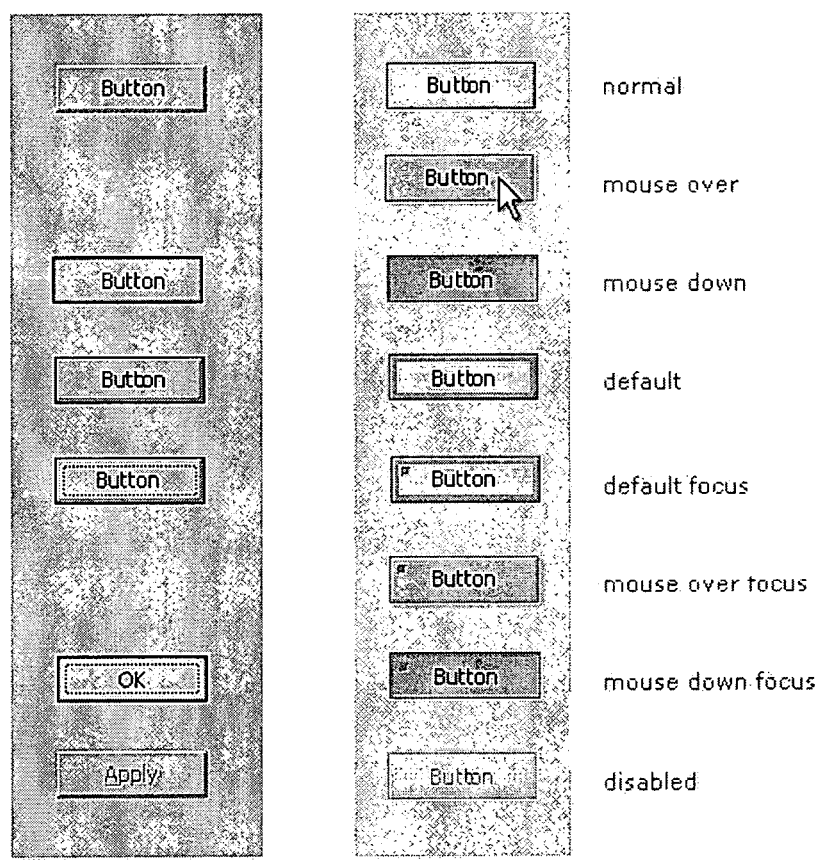
FIG. 9 is a representation of examples of graphical components having different themed appearances with some components exhibiting a focus state.

FIG. 9 illustrates some display examples of a button in various rendered states. There are different themes illustrated in the left column and right column and the name of the state illustrated in each row is at the right edge of the right column of buttons. In the theme in the left column, there is not always a button display for every state. For example, the "mouse over" state has no separate rendered image from the normal state. Also, FIG. 9 illustrates a default state. The default state indicates the control will react to the enter key on the keyboard. The darker border of the default control button in FIG. 9 tells the user that the button is in a default state and pressing the enter key is the same as pressing the button. The focus state condition is indicated in the left column by dashed lines for the default focus state and the mouse down focus state. In the right column, the focus state is indicated by an arrowhead in the upper left column of the button. The default focus, the mouse over focus, and the mouse down focus buttons all have a focus state indicator in the right column of buttons. Each of the buttons in the left and right columns represent a separate rendered bit map image. By dividing the focus state off from the operative state and then combining the states logically to create a combined theme state, the visual style for the focus state may be changed without changing the visual style for each of the operative states.

Figure 2:
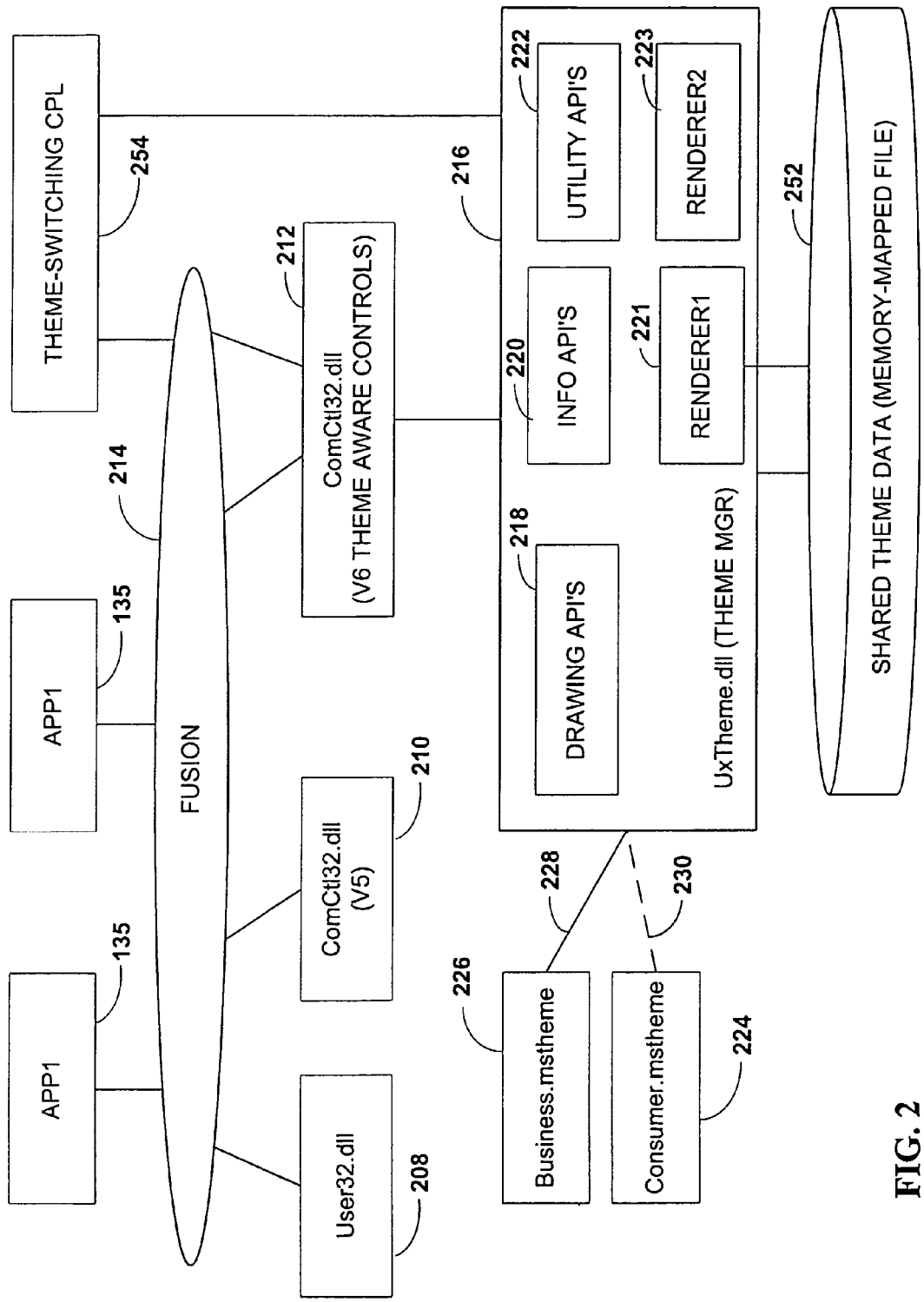
FIG. 2 is a schematic diagram illustrating one embodiment of an architecture used in changing visual styles of graphical components.

The architecture of the themeing system in one embodiment of the present invention is illustrated in FIG. 2. FIGS. 2 through 6 describe in detail the operations and environment of the themeing system. If the reader is already familiar with the operations of the themeing system due to familiarity with the related patent application identified above, then it is suggested that the reader proceed to the description of FIGS. 7 and 8 to understand embodiments of the present invention related to themeing with the focus state.

In FIG. 2, operating system 134 is a graphical operating system having graphically displayed controls and components associated therewith. In addition to controls discussed above, controls also include, but are not limited to, such things as scroll bars, push buttons and sliders. Other controls are within the scope of this invention, and are known to those of skill in the art. Graphically displayed components include, but are in no way limited to, non-client sections of the windows in the display, such as the frame surrounding an application display on the user interface, the minimize box, and the close box.

In FIG. 2, the basic architecture used in this embodiment of the present invention is illustrated. The architecture is illustrated with example applications 135 that are open and running on the computer 110. As an application 135 is running it often requires a control or graphical component to be rendered, or displayed, on the monitor 191 of the computer 110.

In FIG. 2, libraries 208, 210 and 212 are linked to the applications 135 through a fusion module 214. Fusion module 214 enables the themeing of controls in applications without needing to change the applications themselves to request the themeable version of the controls. Fusion module 214 enables each application 135 to load the specific version of the DLL 208, 210 or 212 at run time through the use of a manifest. The fusion manifest specifies the environment in which an application will run, which allows multiples versions of a DLL to exist on one machine. Thus, fusion module 214 will map the request for a component so that it is rendered as a themeable element in DLL 212 instead of a non-themeable element from DLL 208. This allows an existing application to be themed without changing code of the application. Fusion module 214 also allows the new themeable controls to be placed in a different DLL from the existing DLL, which simplifies implementation and minimizes compatibility risks.

Figure 3:
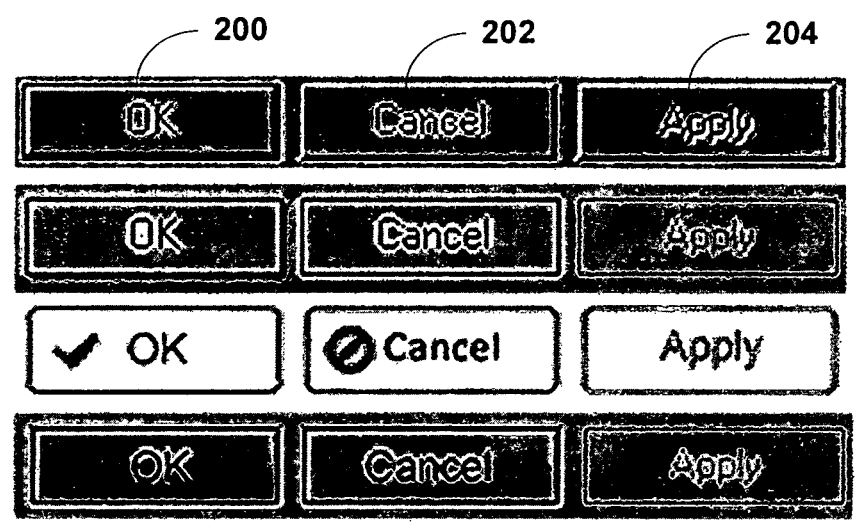
FIG. 3 is a representation of examples of graphical components having different themed appearances.

An example display of graphical control components having a variety of appearances is seen in FIG. 3. As shown in FIG. 3, the controls may take the form of an OK button 200, a Cancel button 202 and an Apply button 204. The appearance of the controls and other components may be visually changed to better suit the desire of the computer user. The appearance of the controls may be altered beyond color and font selection. For example, the layout of the parts of a control can be defined as desired. For example, a scroll bar could be rendered with the up and down arrow buttons adjacent to each other at the bottom of the scroll bar, instead of the up arrow and the top and the down arrow at the bottom. Further, the shape of the control and its parts may be defined. As shown in FIG. 3, four different overall appearances are shown for each of the buttons 200, 202 and 204. Each different appearance setting is coordinated and is called a "theme." Each theme is represented by one of the rows of buttons in FIG. 3. While only four themes are shown in FIG. 3, an unlimited variety of themes may be created for selection by the computer user. The theme is a collection or set of appearance characteristics relating to a particular subject or desired visual environment.

As an application 135 is running it often requires a control or graphical component to be rendered, or displayed, on the monitor 191 of the computer 110. For example, with reference to FIG. 3, the display of an OK button 200 may be needed by the application on the monitor. Application 135 requests that an instance of button 200 be created. Following this, the operating system transmits a generic message to the control instructing it to draw itself. This request would be routed to the dynamic link library (DLL) that contained the particular control. As an example, the DLL in the WINDOWS operating environment would be called User32.dll or ComCtl32.dll(V5), shown as 208 and 210, respectively, in FIG. 2. Libraries 208 and 210 exist within graphical operating system 134. Libraries 208 and 210 are linked through fusion module 214 with applications 135. The defined control within libraries 208 and 210 contains the drawing code needed to render the control on the monitor. Therefore, to change the appearance of controls in libraries 208, and 210, the software drawing code must be changed for each control within libraries 208 and 210.

An additional library DLL, shown as 212 in FIG. 2 similar to library 210, in that it contains a number of predefined controls and graphical components that may be used by application 135. Broadly, DLL 212 contains a number of components that are to be graphically displayed. In library 212, however, the controls are defined differently, making them "theme aware." Rather than containing all of the software code needed to render the control, the controls are defined with certain basic information or values about the control, for example, the location, parts and states of the controls.

The location is the position on the user interface where the control is desired. Parts are the different items that make up the control. For example, OK button 200 has a background part and a text part. As another example, a scrollbar control has an elongated rectangular shaft part, a smaller thumb part that slides within the shaft part, and an arrow part at each end of the shaft part. The state of a control describes the current appearance and functional state. For example, a button can be active, such as normal, hot, selected (pressed) or inactive, such as disabled or unavailable.

In the embodiment of the invention in FIG. 2, libraries 208, 210 and 212 are linked to the applications 135 through a fusion module 214. Fusion module 214 enables the themeing of controls in applications without needing to change the applications themselves to request the themeable version of the controls. Fusion module 214 enables each application 135 to load the specific version of the DLL 208, 210 or 212 at run time through the use of a manifest. The fusion manifest specifies the environment in which an application will run, which allows multiples versions of a DLL to exist on one machine. Thus, fusion module 214 will map the request for OK button 200 so that it is rendered as a themeable element in DLL 212 instead of a non-themeable element from DLL 208. This allows an existing application to be themed without changing code in the application. Fusion module 214 also allows the new themeable controls to be placed in a different DLL from the existing DLL, which simplifies implementation and minimizes compatibility risks.

Controls existing within DLL 212 are therefore used if they are available. As seen above, the controls within DLL 212 are defined as a series of parts and states. The controls within DLL 212 also contain the drawing code needed to render the controls if no themes are selected, as well as the theme-aware paths through the code. DLL 212 requests rendering or drawing services from a theme manager DLL 216. Theme manager 216 provides the requested rendering services and draws the control on the display at the indicated location, with the indicated parts in the indicated states.

Theme manager 216 contains a series of APIs that allow library 212 to interact and communicate with the theme manager. The APIs allow a control author to define a control within DLL 212 as a series of parts and states without the need for software rendering code. These APIs are generally divided into three types: drawing APIs 218, information APIs 220 and utility APIs 222. Drawing APIs 218 are generally used to render and assist in the layout of the needed control parts and other components. Information APIs 220 are generally used to obtain information about the current defined appearance of the controls to allow controls to be individually customized. Utility APIs 222 are those APIs used by parts of the operating system other than the controls, to control theme selection. Utility APIs 222 include functions that can be used to enumerate an installed theme and load it.

Drawing APIs 218 are a collection of theme-aware drawing services. Each individual API within the set of drawing APIs 218 is used to perform a different drawing service. Generally, each API requires a specified part and state of the graphical component at hand. An API called "DrawThemeBackground" is provided that draws the theme-specified border and fill for the specified part and state at the desired location. Similarly, an API called "DrawThemeText" is provided that draws the specified text using the theme-specified color and font for the specified part and state.

Figure 4:
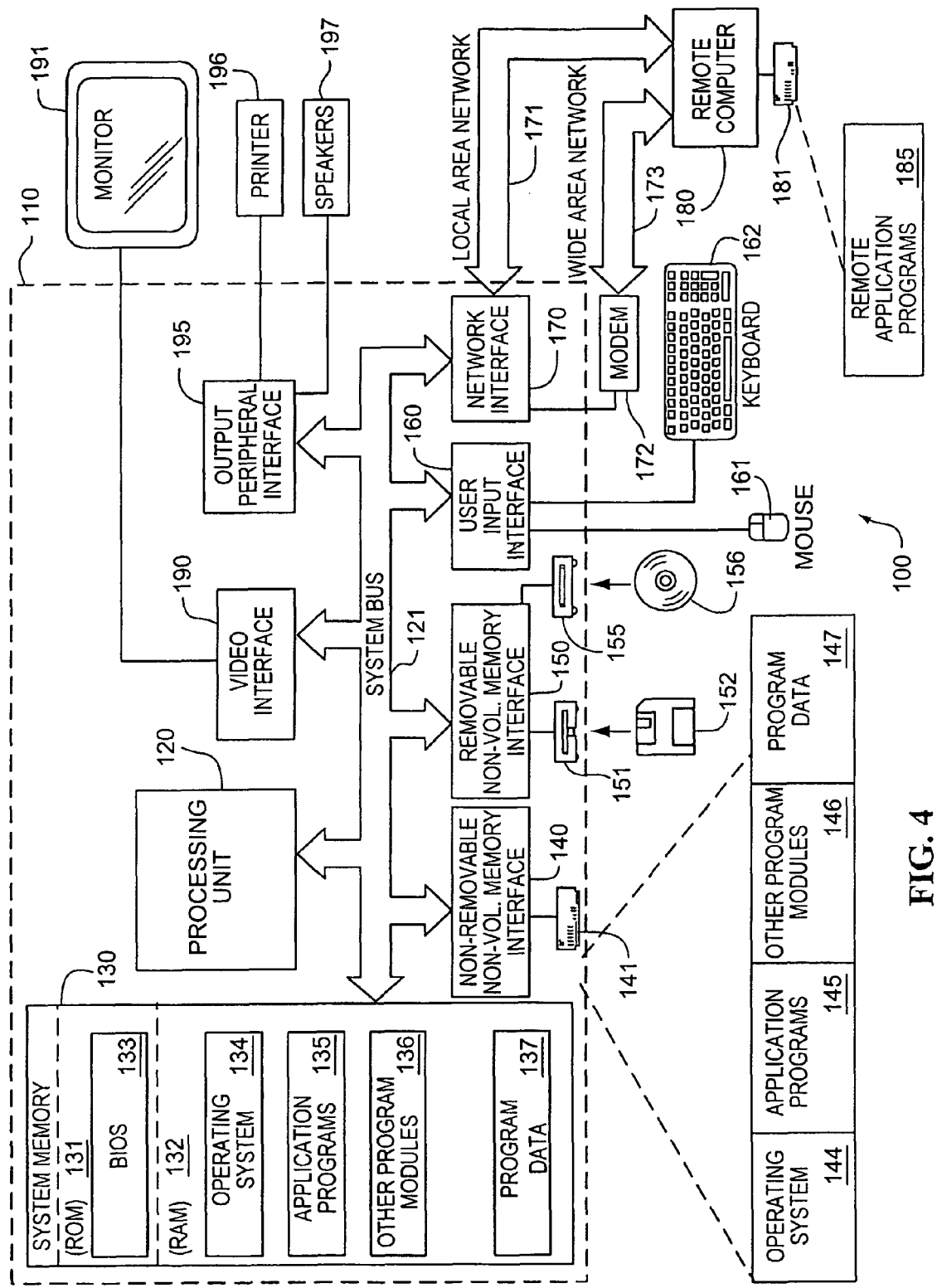
FIG. 4 is a block diagram of a suitable computing system environment for use in implementing the present invention.

FIG. 4 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 144 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 192.

Returning now to the system architecture in FIG. 2 and the example buttons in FIG. 3, if an OK button 200 (FIG. 3) was requested by an application 135, the control within DLL 212 would pass the part, state and location information to drawing APIs 218 through a function call, such as DrawThemeBackground, or DrawThemeText. As is more fully described below, this part and state information is matched with appearance characteristics and theme manager 216 draws the control on the monitor. Drawing APIs 218 further include an API called "GetThemeBackgroundContentRect." This API allows the control to obtain the size of the content for the theme-defined background. Usually, this is the area inside the borders or margins. By using this API a control can determine the available area within the background in which items may be placed. When using this API, the control within DLL 212 is requesting information regarding a graphical component with a specified part and state. This information is obtained by the theme manager 216 and returned to the control. A similar API called "GetThemeBackgroundExtent" is provided that calculates the size and location of the theme-specified background for the specified part and state given a content rectangle. This API may be used when the content is known, and based upon that content, the outer boundary for the theme background needs to be determined. Another API called "GetThemePartSize" is provided to retrieve the theme author specified minimum and normal sizes of a control part.

Drawing APIs 218 further include an API entitled "GetThemeTextExtent." This API is used to calculate the size of a specified text when rendered in the theme font. This API can therefore be used to determine the width and height of a given text string. The control author can thus specify a part and state having text associated therewith and use this API to obtain information from theme manager 216 regarding the size of the text string. Similarly, another API entitled "GetThemeTextMetrics" is available that can be used to obtain size information about the font being used. Therefore, this API may be used to obtain information such as the width of an average font character. In other words, this API is used to obtain from theme manager 216 information that the control needs regarding the size of a theme-specified font.

An API entitled "GetThemeBackgroundRegion" is also provided within drawing APIs 218. Within some operating systems, a region is a way to describe a non-rectangular shape. A region can also be thought of as an image with transparent parts. This API is used to compute the region for a regular or partially transparent theme-specified background. In other words, this API may be used to determine what is transparent and what is opaque within the framed background for a specified part and state. Thus, this API supports the definition of non-rectangular shapes of controls and parts. Similarly, an API entitled "HitTestThemeBackground" is provided. This API is used to determine whether the point within the background for the specified part being clicked is in a transparent or an opaque area. This API is used by a control within DLL 212 to obtain information from the theme manager 216. If the click is within a transparent area, no action may be needed. Conversely if the click is within an opaque area, an action may be required.

Another API contained within drawing APIs 218 is entitled "DrawThemeLine." This API allows a theme to define a generic style of a line. This generic style may be accessed and used for a specified part by calling the "DrawThemeLine" API. Similarly, an API entitled "DrawThemeBorder" is provided that allows a theme-defined border to be specified. The theme-border may be drawn for a specified part utilizing this API.

An API entitled "DrawThemeIcon" is provided that allows a theme-defined icon to be rendered that may include theme-specified special effects. For example, a theme-icon may have a different appearance when the mouse is directly over the icon, such as a glowing appearance.

Drawing APIs 218 also contain an API entitled "IsThemePartDefined" that may be used to determine if the theme has defined parameters for the specified part and state. If the part is not defined within the theme the control can draw this part itself. If the part is theme defined, theme manager 216 will render the part according to the theme defined information. Another API is provided entitled "IsThemeBackgroundPartiallyTransparent." This API is used to determine whether or not the background is a rectangle or region that has a transparent part. This API may be used to simplify the control code. If there is no transparency within the background, then there is no need to conduct any hit testing through the use of the "HitTestThemeBackground" API.

Importantly, drawing APIs 218 further include an API entitled "OpenThemeData." This API is used to obtain the handle for a list of class names. A class name list identifies a set of graphical components, and may be divided into parent class names and one or more child class names. For examiner, a parent class name might be button. A child class name for that parent class might be "start button." A handle is a reference to an internal structure detailing various information and properties of the object. Theme manager 216 will search for each class name in the list and use the first matching theme information found. For example, if the class names included both start button and button, the start button theme information would be used if it existed. If start button theme information did not exist, the theme information for a button would be used. If no value is found the old code will be used to render the control. If any non-0 value is returned, a valid theme handle is established. This theme handle will be returned to DLL 212 and used for all of the theme drawings.

Similarly, another API provided is entitled "CloseThemeData." This API is used when the control is closed, such as a button no longer being needed, or when the theme is changed, as is more fully described below.

Another API provided is entitled "IsThemeActive." This API allows a control within DLL 212 to obtain a true or false answer as to whether there is a current theme in effect. This API can thus be used to determine whether to call the "OpenThemeData" API or merely use the existing drawing code where the controls will render themselves.

As described above, theme manager 216 also contains a set of information APIs 220. These information APIs 220 allow controls to be individually customized. In other words, these APIs are utilized in only certain instances and may be used to obtain information about specific controls. These information APIs are used to query theme manager 216 for defined theme information regarding specified properties of the theme. Each API 220 thus requests information, which is provided by theme manager 216.

Within information APIs 220 is an API entitled "GetThemeColor." This API utilizes the specified part and specified state along with a specified color property identifier to obtain information about the theme color. The property identifier is the color property number that is desired. In other words, the color API is used to ask for the color value corresponding to the property desired, such as the background color. Another API called "GetThemeMetric" is provided that requests and receives a size value for a specified property identifier. This size value will be an integer. An API entitled "GetThemeString" is also provided within information APIs 220. This API is used to obtain the string for a specified property identifier. The string will include information regarding the number of characters in the string and where the string is terminated.

Another API is provided within information APIs 220 entitled "GetThemeBool" that will return an integer that is either 0 or 1 for a given part, state and property. The 0 and 1 correspond to a false or true state for that part, state and property. Another API provided is entitled "GetThemeInt." That will return an integer value for a specified part, in a specified state with a specified property identifier. Similarly, an API is provided entitled "GetThemeEnumValue" that will return the theme-enum for the specified part, state and property identifiers. An enum is merely a variable that holds numeric values which correspond to symbolic information. For example, an enum for alignment might be left, middle, right corresponding to the numbers 0, 1, 2.

Another API entitled "GetThemePosition" is provided that will return two integer values, corresponding to an x-location and a y-location for a specified part in a specified state with a specified property identifier. Another API provided within information APIs 220 is entitled "GetThemeFont." This API is used to obtain a logical description of the font theme used, given a specified part, state and property identifier.

Yet another API provided within information APIs 220 is entitled "GetThemeRect." This API will return four integers representing the left, right, top and bottom of the specified part, state and property identifier. Similarly, an API entitled "GetThemeMargins" is provided that will return four integers representing a left space, right space, top space and bottom space given a specified part, state and property identified. There is also an API entitled "GetThemeIntList" which returns the value of a specified property whose type is a list of integer values. Finally, an information API entitled "GetPropertyOrigin" is provided that returns the location from which the property originated. This API allows the control author to obtain information for the property origin. In other words, the API allows the control author to determine whether the property was specified on the state, part, class, global or was the property not found. This is needed because theme properties are specified by the theme author in a hierarchical fashion. For example, if a property is not specified at the "state" level, the theme manager will search the "part" level, "class" level, and finally the "globals" level for the property. Sometimes it is important for the control to know if a property was explicitly defined for the part/state it is processing. There is also an API entitled "GetThemeFilename" which returns the string value of the specified filename property.

Another API provided within information APIs 220 is entitled "SetWindowTheme." This API allows a control author to redirect a control window to use a different set of theme information than its class would normally use. In other words, this API allows a control to be used while giving the control a special look other than the standard look defined by the theme for that class. This API may use additional parameters to identify a particular application and class name. This allows a theme author to use the specified class but to change the appearance of that class. For example, a button may be defined that has a given button appearance. Utilizing this API, this button can be redirected to a different class name. For example, "OkayButton" may be specified. The theme author will then be able to use a class called "OkayButton" and the "OkayButton" will have a different appearance from the standard button appearance.

There is also a subset of theme metrics APIs within the information API group that parallel the WINDOWS system metrics, but which are specific to a theme. Unlike normal control-based properties, these properties are available to and shared by all controls. "GetThemeSysColor" returns the theme-specified color value of the specified system color index. "GetThemeSysColorBrush" returns a handle to a drawing brush that is the color of the specified system color index. "GetThemeSysSize" returns the integer size of the specified theme size index. "GetThemeSysBool" returns a boolean (0 or 1) value for the specified theme boolean index. "GetThemeSysFont" returns a logical font structure for the specified theme font index. "GetThemeSysString" returns a string value of the specified theme string index.

There are also some application-oriented API's within the information API group 220. "IsAppThemed" returns a boolean (0 or 1) value indicating if the application is being themed by the operating system. "GetWindowTheme" returns the most recent theme handle, if any, opened for the specified window. "GetThemeAppProperties" returns the flags that control which parts and types of windows are themeable within the application. "SetThemeAppProperties" allows the application to set these same flags.

Finally, there are information API's 220 for error handling. "GetThemeLastErrorContext" returns the error context (including error code, error code parameters, filename and source line) associated with the last reported theme error on the current thread of execution. "FormatThemeMessage" returns the error string for the specified error context in the specified language.

Theme manager 216 includes not only drawing APIs 218 and information APIs 220, but also a set of utility APIs 222. These APIs may be used to achieve a variety of results.

Drawing APIs 218 and information APIs 220 allow the author or creator of controls within DLL 212 to define the controls as a series of parts and states. The defined control is therefore abstracted from the rendering process of theme manager 216 and is also abstracted from the theme-defined appearance information or characteristics, as is more fully described below. Using APIs 218 and 220 the control author can create controls that are "theme-aware" and that are equipped to communicate with theme manager 216. This communication involves passing basic information or values to theme manager 216 that allow the theme manager to render the desired control, having the needed parts in the desired states.

Theme manager 216 also contains the renderers needed to execute the drawing instructions. For example, a border-fill renderer 221 could be used that allows different color themes to be applied to the controls. As another example, a bitmap renderer 223 could be used that defines the control parts as images. Other examples of renderers include using a vector definition language, portable network graphics (PNG) files, or portable document format files (PDF). It should be understood that the present invention is not limited to a particular rendering technology. If a different renderer is desired or needed, the drawing code of theme manager 216 is revised to add the renderer to theme manager 216. The controls within DLL 212 are therefore isolated or abstracted from the rendering technology within theme manager 216. This allows different renderers to be added to theme manager 216 without having to revise the controls within DLL 212, as is more fully explained below.

The renderer within theme manager 216 renders the requested control according to an appearance theme that has been selected by the user of the computer. For example, appearance themes 224 and 226 are shown in FIG. 2. As shown, theme 224 may be a consumer theme and theme 226 may be a business theme. It should be understood, however, that other themes could be used and that the invention is in no way limited to the particular theme. For example, other themes could include a cartoon theme, a children's theme or a golf theme. As seen in FIG. 2, business theme 226 has been selected by the user, as represented by the solid line 228. Consumer theme 224 is available for selection, as represented by the broken line 230.

Figure 5:
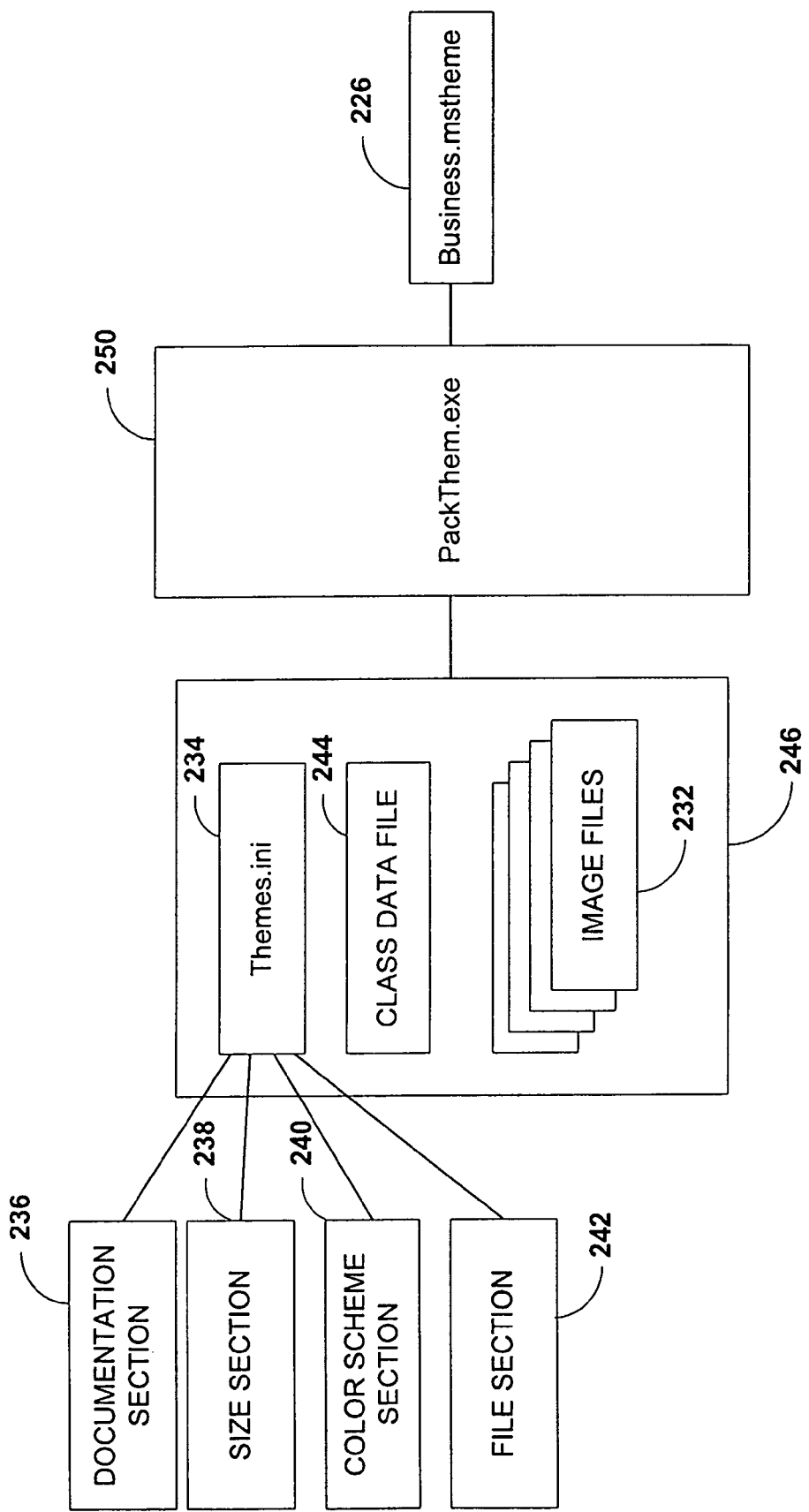
FIG. 5 is a schematic diagram illustrating the architecture of a theme file.

Each theme 224 and 226 has similar architecture. As seen in FIG. 5, business theme 226 includes a series of image files 232. Image files 232 are the image files that will be used by the particular theme. In this case, image files 232 are the image files that will be used by business theme 226. Business theme 226 also includes a themes.ini file 234. File 234 is a text file and can be created in either ANSI or UNICODE character sets. File 234 specifies the available color schemes and sizes available for the theme. In the case of theme 226, file 234 specifies the available color schemes and sizes available for business theme 226. File 234 therefore represents all of the variations of the theme to which it applies.

Theme file 234 consists of one or more sections. The sections within theme file 234 include a documentation section 236, a size section 238, a color scheme section 240 and a file section 242. Documentation section 236 is optional and may contain any property name. Size section 238 specifies the size name, such as "default size," "very small" or "very large." Color scheme section 240 is used to specify a simple color scheme name and an optional color scheme transformation associated with the color scheme name. File section 242 is used to specify a unique name for the class data file. The file section 242 will include a file name, a color scheme (from color scheme section 240) for that file name, and the sizes (from the size section 238) that the file will support.

Theme 226 includes a second .ini file labeled 244 in FIG. 5. File 244 is a class data file that contains the theme data for a specific size and color theme. File 244 may also contain defining sections. For example, file 244 may contain a globals section that defines the properties of the particular class of control. File 244 may also contain a section that allows the system metrics to be obtained and used. Finally, file 244 may contain a group of class sections. Each class section name contains a class name, an optional part name, and an optional state name. Within the section are the property/value pairs that define the appearance of the specified part or control. For example, a class name would be "slider" for the slider control. A part specified for the slider would be "track." States defined for the track part would be "normal," "disabled," and "hot." The class section name can also include an application (or "group") name, which specifies that the section only applies to a specific application (or "group" name, as specified by the SetWindowTheme API).

Image files 232, theme file 234, including file 244 are broadly grouped together to make up theme directory 246. Theme directory 246 and a system schema file located within the theme manager 216 are used to load business theme 226. The system schema file is the file that defines property numbers for all of the properties involved in a particular theme and is basically a master definition file that allows the themed properties to be assigned a number corresponding to a defined appearance.

Theme directory 246 thus contains a theme.ini file 234, a class data file 244 and all of the image files 232 used by the theme. The contents of theme directory 246 can be packaged into a DLL file by packthem tool 250. Packthem tool 250 processes the theme.ini file by parsing it against the schema file for syntax errors and adding the .ini file to the package being built. Recognized properties from documentation section 236 are written to a package string table. Color scheme information from color scheme section 240 and size information from size section 238 is also written to a package string table. Each class data file 244 is also processed. As the class data file is processed, the file is parsed against the schema file for syntax errors. The class data file is also added to the package being built.

The DLL file produced by packthem tool 250 is business theme file 226. File 226 contains the theme data and this theme data is isolated from control library 212. This allows different themes to be created and selected without changing the controls defined within library 212. Thus, control authors can create and define controls independently of the appearance or theme data. File 226 is in binary format and is passed into a shared theme data file 252 when business theme 226 is selected by the computer user, as best seen in FIG. 2. File 252 is a shared memory map file that can be accessed by all processes. Thus, when a theme is selected by the computer user, theme manager 216 will read the information for a defined theme file, such as file 226, and will place that information in a binary format in file 252 where all running processes have access to the binary information.

As best seen in FIG. 2, a theme-switching control panel 254 is provided that is in communication with theme manager 216. Panel 254 cooperates with a user interface that displays the available themes from which the user can select. As shown in FIG. 2, control panel 254 would allow a user to select business theme 226 or consumer theme 224. If, as has been discussed above, business theme 226 is selected and the user of the computer switches to select consumer theme 224, theme 224 will be loaded into shared memory map file 252 as binary data. Theme manager 216 also sends a message to each theme-aware control within DLL file 212 that the theme has changed. Each theme-aware control knows how to respond to this message.

When the theme-aware control receives a message that the theme has changed, the control will close the current theme handle that was received via the OpenThemeData API. The control will then attempt to open a new theme handle, again using the OpenThemeData API. If a new theme handle cannot be opened, the control knows that the theme has been switched off for that control and that the old drawing code is to be used by the control to draw itself. If a new theme handle is opened, theme manager 216 will look at the theme binary data and will start a new drawing routine so that all of the theme-aware controls are redrawn utilizing the newly selected theme, such as consumer theme 224. Any information that was cached regarding the previously selected theme is invalidated and that information must be recalculated.

Figure 6:
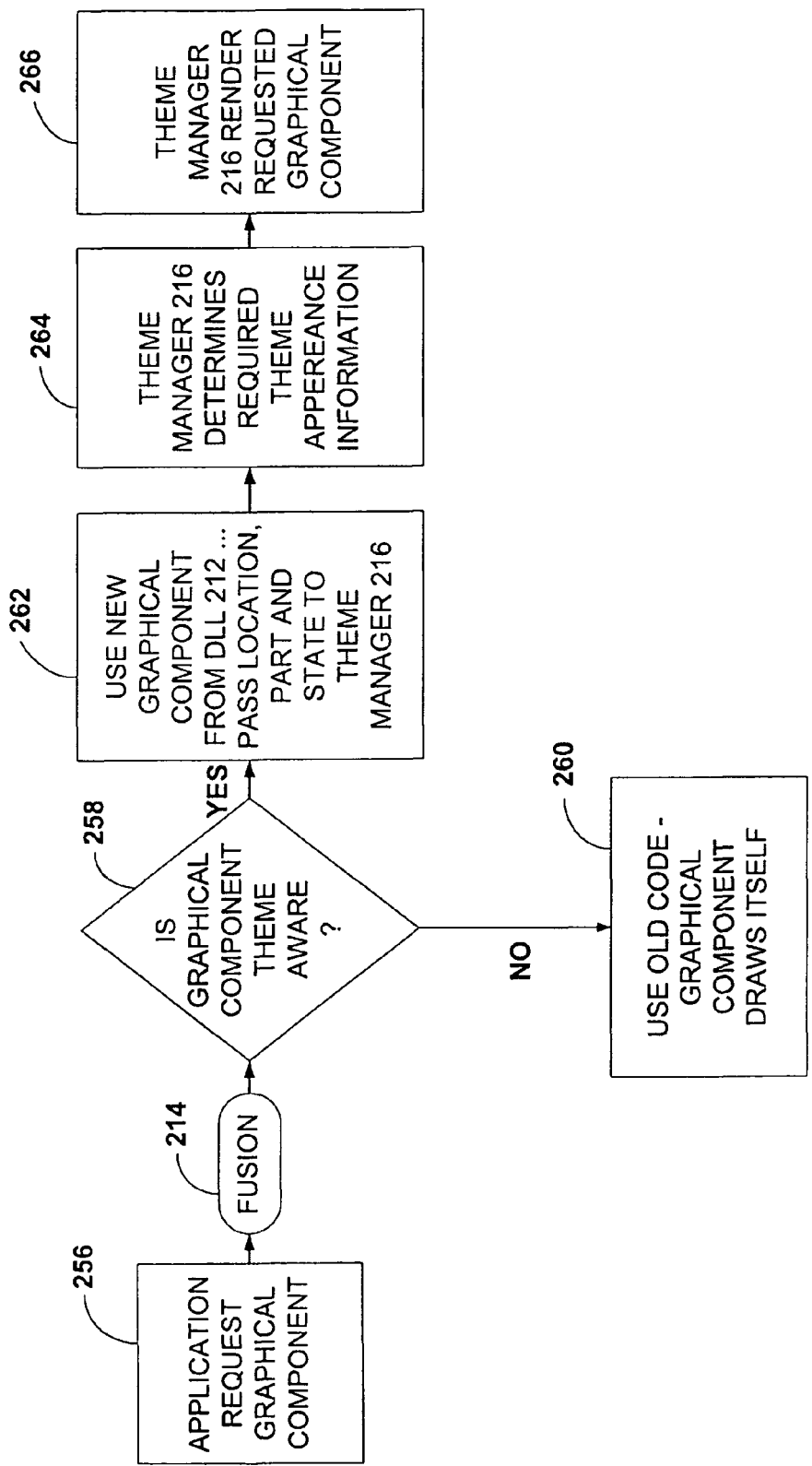
FIG. 6 is a flow chart illustrating logical operations performed in rendering theme-aware components and non theme-aware components in a graphical operating system.

In operation, as is best seen in FIG. 6, an application 135 will request a graphic, such as a control, to be rendered on the user interface, as represented at 256. This graphical request is routed through fusion 214. As represented by 258, the fusion process will determine if the requested control is a theme-aware control. If the control requested is not theme-aware, the old code is used and the control will draw itself using a control from DLL 208 or 210, as represented by 260 in FIG. 6. If the control is theme aware, the graphical request is processed in DLL 212, as is represented by 262. The controls within DLL 212 will pass basic information for the graphical request, such as the part, state and location for the requested control to the theme manager 216 in a request for rendering services, using APIs 218, 220 and 222. Thus, the graphical request is processed in DLL 212 without application of the appearance characteristics that are found by theme manager 216. Theme manager 216 will then determine or apply the theme-specific appearance characteristics for the given control part and state, as shown by 264. This appearance data is retrieved from the shared memory map data file 252. Using the retrieved appearance data, for the requested control part and state, along with the location, the theme manager will render the control on the display of the computer, as represented by 266.

Figure 7:
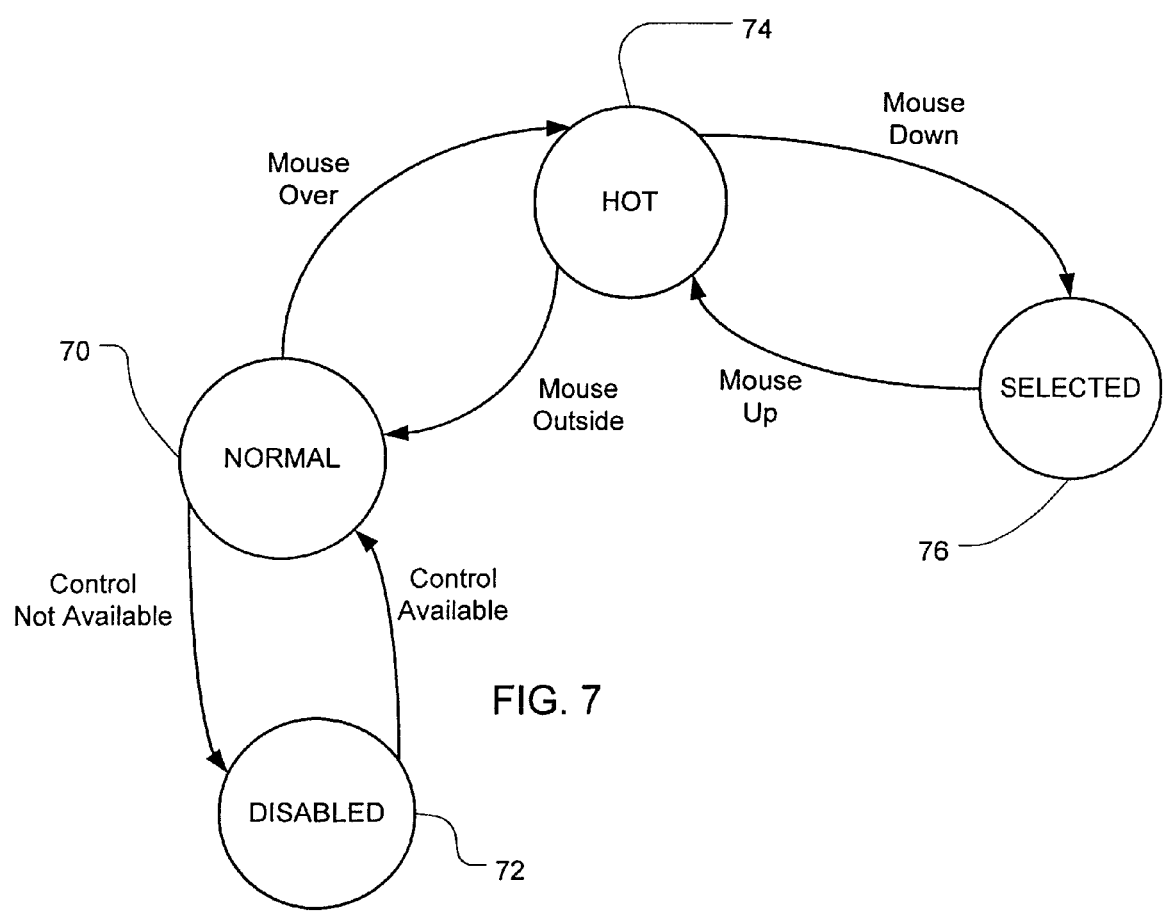
FIG. 7 is a state diagram illustrating operative states and conditions for moving between operative states of a control element.

Referring now to FIG. 7, one embodiment of operations of the operative state module 10 (FIG. 1) are illustrated by a state diagram. A control element may be in four possible states, disabled, normal, hot, or selected. These operative states for the control are set by the operating system or by the application in working with the operating system if the control is in an application. If the control is in a normal operative state 70, this indicates that the operation represented by the control is available. If the operating system or the application indicates the operation represented by the control is not available, then a control not available condition switches the operative state to the disabled state 72. When the operating system or the application working with the operating system determines the operation is available, then the control is available and the state of the control returns to normal state 70. If the cursor is positioned over the control indicating a "mouse over" condition, then the state switches from normal to hot state 74. In the hot state 74, a click or "mouse down" condition would change the control state from hot to selected state 76. A release of the mouse button indicating a "mouse up" condition would return the control state to the hot state 74. Likewise, when the mouse is moved so that the cursor is outside the control element on the display, then the "mouse outside" condition causes the hot state to revert to a normal state for the control. Thus, in this embodiment of the invention an operating system or an application by monitoring the mouse or cursor conditions and the control availability will generate the operative state for use by the rendering operations in drawing the control on the display.

In another embodiment (not illustrated) of the operative state module 10 (FIG. 1), movement between operative states of a control is accomplished with key strokes. For example, if the control buttons are in an unfocused available state such as normal or hot, the tab key may be successively pressed to move the focus state successively through the control buttons. When a control button enters a focused state, it may then be selected by pressing the space key. Accordingly in this embodiment an operating system or an application monitors the state of the controls and the movement between controls by activation or pressing of the tab key. It will be appreciated that there are many ways in which the operative state module could be implemented to provide the operative state information used by other logical operations in FIG. 1.

Figure 8:
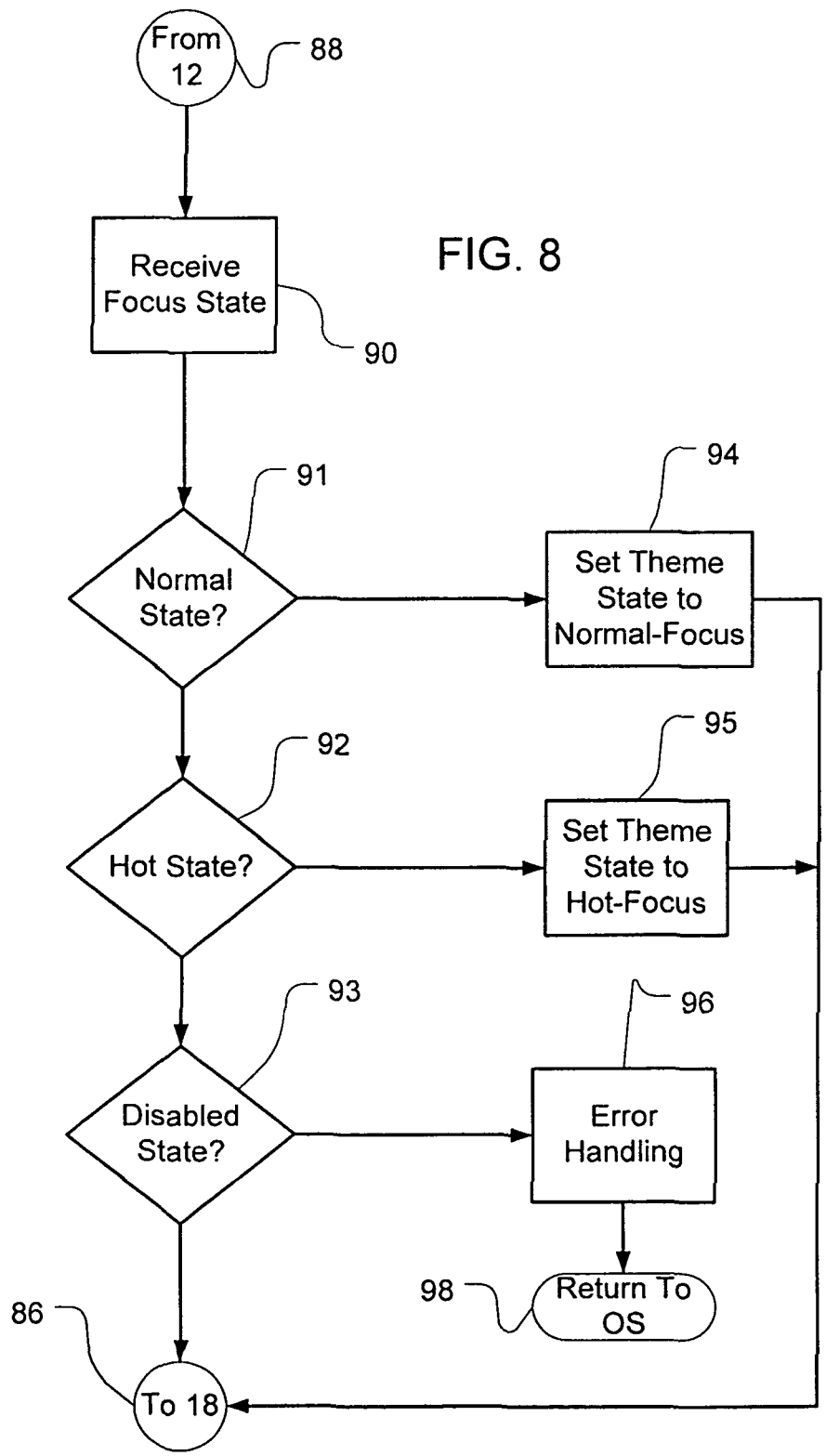
FIG. 8 is a flow chart of logical operations illustrating the details of the build combined state module 16 of FIG. 1.

FIG. 8 illustrates the operations performed by the build or create theme state module 16 in FIG. 1. When the operating system has detected that a focus state condition exists for the control as discussed with reference to FIG. 1, then the operation flow connects through connector 88 to receiving operation 90. The build theme state module begins with receiving operation 90 receiving the focus state theme indication. State detectors 91, 92, and 93 then test what the operative state of the control is. While FIG. 8 represents that detector 91 tests for the normal state, detector 92 detects the hot state, and detector 93 looks the disabled state, the sequence of detections is not important. All that matters is that when a given state is detected, the operation appropriate to that state is then taken.

If the operative state is normal, the operational flow branches YES from normal state detector 91 to set theme state 94 operation. Set theme state operation 94 sets the theme state to the normal-focus state. Thereafter, the operation flow returns to operation 18 in FIG. 1 through flow connector 86 to draw the control in the theme state. Draw operation 18 retrieves the properties for the normal-focus theme state in rendering the control.

Similarly, if hot state detector 92 detects that the operative state was the hot state, operation flow branches YES to set theme state operation 95. Operation 95 sets the theme state to the hot-focus state. The operation flow returns to draw operation 18 in FIG. 1 which retrieves the hot focus properties and draws the control in the hot focus state.

Disabled state detector 93 detects whether the control is active or inactive. If a focus state has been identified for an inactive control, such as disabled or unavailable, this represents an error since a disabled control would not be properly in a focused state. Therefore, the operation flow branches YES from the disabled state detector to an error handling routine 96. When the error handling operations are complete, the return operation 98 returns the operational flow to the main operating system flow rather than to the draw operation 18 in FIG. 1. Alternatively, this active or inactive operative state detect operation 93 could be performed along with focus state detect operation 12 in FIG. 1. If operation 93 is performed in this manner, it need not be performed in FIG. 8.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. A computer program product, stored on at least one computer storage medium, encoding computer executable instructions for executing a method for displaying at least one control on a display, the method comprising:

displaying a plurality of operative state themes for selection, wherein each of the plurality of operative state themes defines customized appearance settings for the at least one control based on an operative state of the at least one control, and wherein the customized appearance settings comprise one or more of: a control shape and a control layout;

receiving a selection of an operative state theme;

displaying a plurality of focus themes for selection, wherein each of the plurality of focus themes defines different customized appearance settings for the at least one control based on a focus state of the at least one control;

receiving a selection of a focus theme;

determining the operative state for the at least one control in a user interface, wherein the operative state comprises one of: a normal state, a default state, a disabled state, a hot state, or a selected state;

determining the focus state for the at least one control, wherein the focus state comprises one of: focused or unfocused;

upon determining the operative state and the focus state for the at least one control, merging the customized appearance settings of the selected operative state theme with the different customized appearance settings of the selected focus theme to generate a merged theme for the at least one control, comprising one of:

displaying the at least one control according to a normal-focus theme when the determined operative state is a normal state and the determined focus state is focused, wherein displaying the at least one control according to the normal-focus theme comprises creating a merged graphical image that combines a first graphical image associated with the selected operative state theme for the normal state with a second graphical image associated with the selected focus state theme for the focused state;

displaying the at least one control according to a default-focus theme when the determined operative state is a default state and the determined focus state is focused, wherein displaying the at least one control according to the default-focus theme comprises creating a merged graphical image that combines a first graphical image associated with the selected operative state theme for the default state with a second graphical image associated with the selected focus state theme for the focused state;

displaying the at least one control according to a hot-focus theme when the determined operative state is a hot state and the determined focus state is focused, wherein displaying the at least one control according to the hot-focus theme comprises creating a merged graphical image that combines a first graphical image associated with the selected operative state theme for the hot state with a second graphical image associated with the selected focus state theme for the focused state; and displaying the at least one control according to a selected-focus theme when the determined operative state is a selected state and the determined focus state is focused, wherein displaying the at least one control according to the selected-focus theme comprises creating a merged graphical image that combines a first graphical image associated with the selected operative state theme for the selected state with a second graphical image associated with the selected focus state theme for the focused state.

2. The computer program product as defined in claim 1, wherein the operative state theme includes a separate theme for each of the normal state, the disabled state, the hot state, and the selected state.

3. The computer program product as defined in claim 1, wherein the determination of the focus state for the at least one control is based on a focus input from a user interface.

4. The computer program product as defined in claim 3, wherein the focus input is one of a mouse input, a keyboard input, a trackball input, a touch pad input, a joystick input and a microphone input.

5. The computer program product as defined in claim 1, wherein the act of displaying the at least one control using the normal-focus theme comprises:
receiving operative state theme data for the normal state and focus theme data for the focused state;
drawing the at least one control based on the operative state theme data for the normal state; and
drawing a focus indicator on the at least one control based on the focus theme data for the focused state.

6. The computer program product as defined in claim 1, wherein the act of displaying the at least one control using the hot-focus theme comprises:
receiving operative state theme data for the hot state and focus theme data for the focused state;
drawing the at least one control based on the operative state theme data for the hot state; and
drawing a focus indicator on the at least one control based on the focus theme data for the focused state.

7. The computer program product as defined in claim 1, wherein the act of displaying the at least one control using the selected-focus theme comprises:
receiving operative state theme data for the selected state and focus theme data for the focused state;
drawing the at least one control based on the operative state theme data for the selected state; and
drawing a focus indicator on the at least one control based on the focus theme data for the focused state.

8. A computer storage medium encoding computer executable instructions for performing a method of providing a merged theme when displaying a control on a user-interface, the method comprising:

displaying a plurality of operative state themes for selection, wherein each of the plurality of operative state themes defines customized appearance settings for the control based on an operative state of the control, and wherein the customized appearance settings comprise one or more of: a control shape and a control layout;

receiving a selection of an operative state theme for the control;

displaying a plurality of focus themes for selection, wherein each of the plurality of focus themes defines different customized appearance settings for the control based on a focus state of the control;

receiving a selection of a focus theme for the control;

determining the operative state of the control, wherein the operative state of the control comprises one of: a normal state, a default state, a disabled state, a hot state, or a selected state;

determining the focus state of the control, wherein the focus state comprises one of: focused or unfocused;

generating the merged theme for the control by merging the customized appearance settings of the selected operative state theme and the different customized appearance settings of the selected focus theme, comprising one of:

displaying the control according to a normal-focus theme when the determined operative state is a normal state and the determined focus state is focused, wherein displaying the control according to the normal-focus theme comprises creating a merged graphical image that combines a first graphical image associated with the selected operative state theme for the normal state with a second graphical image associated with the selected focus state theme for the focused state;

displaying the control according to a default-focus theme when the determined operative state is a default state and the determined focus state is focused, wherein displaying the control according to the default-focus theme comprises creating a merged graphical image that combines a first graphical image associated with the selected operative state theme for the default state with a second graphical image associated with the selected focus state theme for the focused state;

displaying the control according to a hot-focus theme when the determined operative state is a hot state and the determined focus state is focused, wherein displaying the control according to the hot-focus theme comprises creating a merged graphical image that combines a first graphical image associated with the selected operative state theme for the hot state with a second graphical image associated with the selected focus state theme for the focused state; and displaying the control according to a selected-focus theme when the determined operative state is a selected state and the determined focus state is focused, wherein displaying the control according to the selected-focus theme comprises creating a merged graphical image that combines a first graphical image associated with the selected operative state theme for the selected state with a second graphical image associated with the selected focus state theme for the focused state.

9. The computer storage medium as defined in claim 8, wherein the selected focus theme comprises a predetermined theme different from the selected operative state theme for the control.

10. The computer storage medium as defined in claim 8, wherein displaying the control using the merged theme comprises:
retrieving selected operative state theme properties;
retrieving selected focus theme properties; and
drawing the control using both the selected operative state theme properties and the selected focus theme properties.

11. A system for rendering controls in a user interface, comprising:
one or more processors for executing computer executable instructions; and
one or more computer readable storage media storing computer executable instructions that when executed by the one or more processors provide:
an operating state detector detecting an operative state of one or more controls;
a focus state detector detecting a focused state of at least one control;
a selection module providing:
a plurality of operative state themes for selection, wherein each of the plurality of operative state themes defines customized appearance settings for the one or more controls based on a detected operative state for each control, and wherein the customized appearance settings comprise one or more of: a control shape and a control layout; and
a plurality of focus themes for selection, wherein each of the plurality of focus themes defines different customized appearance settings for the at least one control based on the detected focus state of the at least one control;
a theme module that builds themes for the one or more controls and the at least one control based on a selected operative state theme and a selected focus theme, wherein building themes comprises:
building the selected operative state theme having customized appearance settings based on the detected operative state of each of the one or more controls, wherein the theme module builds a separate theme for each of: a normal state, a default state, a disabled state, a hot state, and a selected state; and
building a merged theme of the at least one control by merging the customized appearance settings of the selected operative state theme and the different customized appearance settings of the selected focus theme, wherein the theme module builds the merged theme based on the detected operative state of the at least one control and the detected focus state of the at least one control, wherein building the merged theme comprises one of:
building a normal-focus theme when the determined operative state is a normal state and the determined focus state is focused, wherein building the normal-focus theme comprises creating a merged graphical image that combines a first graphical image associated with the selected operative state theme for the normal state with a second graphical image associated with the selected focus state theme for the focused state;
building a default-focus theme when the determined operative state is a default state and the determined focus state is focused, wherein building the default-focus theme comprises creating a merged graphical image that combines a first graphical image associated with the selected operative state theme for the default state with a second graphical image associated with the selected focus state theme for the focused state;
building a hot-focus theme when the determined operative state is a hot state and the determined focus state is focused, wherein building the hot-focus theme comprises creating a merged graphical image that combines a first graphical image associated with the selected operative state theme for the hot state with a second graphical image associated with the selected focus state theme for the focused state; and
building a selected-focus theme when the determined operative state is a selected state and the determined focus state is focused, wherein building the selected-focus theme comprises creating a merged graphical image that combines a first graphical image associated with the selected operative state theme for the selected state with a second graphical image associated with the selected focus state theme for the focused state; and
a rendering module that renders the one or more controls and the at least one control based on the themes built by the theme module.

12. The system as defined in claim 11, wherein the rendering module renders each of the one or more controls using only the selected operative state theme for one of the normal state, the disabled state, the hot state, and the selected state.

* * * * *